Nov. 15, 1938.  H. WESTBERG ET AL  2,136,658

WIENER ROASTER AND THE LIKE

Filed April 15, 1937

INVENTOR.
HARRY WESTBERG
RICHARD F. OLSON
BY
ATTORNEYS.

Patented Nov. 15, 1938

2,136,658

UNITED STATES PATENT OFFICE 2,136,658

WIENER ROASTER AND THE LIKE

Harry Westberg, Los Angeles, and Richard F. Olson, Glendale, Calif.

Application April 15, 1937, Serial No. 137,050

4 Claims. (Cl. 53—5)

This invention relates to a cooking device, and particularly pertains to a wiener roaster and the like.

When beach and camping parties take place it is often desirable to roast or broil wieners, fish, bacon, and pieces of other meat. This is now accomplished in most instances by using a spit on to which the article to be broiled or roasted is placed, after which the spit is turned to subject the article to the action of heat on all of its sides. This is not a convenient or satisfactory method of cooking, since the articles may easily fall off, and since in the case of wieners the skin of the wiener is punctured so that the juices within it will be forced out and lost. It is the principal object of the present invention to provide a roasting or broiling implement within which articles of food, such as wieners, fish, and the like may be placed, and may be supported conveniently over fire so that they may be thoroughly and uniformly broiled or roasted, the structure being of simple construction and so designed as to make it possible for the parts to be assembled and disassembled, making it convenient for use in camping kits and the like.

The invention is illustrated by way of example in the accompanying drawing in which.

Figure 1:
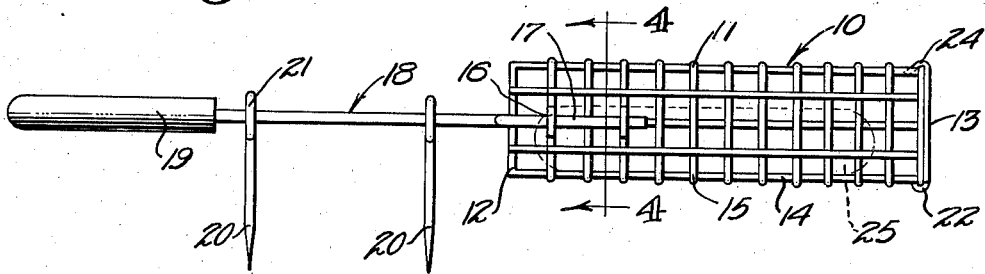
Figure 1 is a view in perspective showing the present invention.
Figure 2:
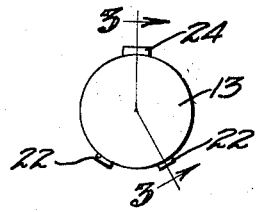
Fig. 2 is a view in end elevation showing the lid on the device.
Figure 3:
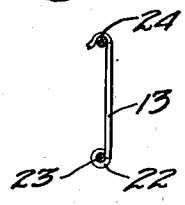
Fig. 3 is a view in transverse section through the end of the device showing the lid construction, as seen on the line 3—3 of Fig. 2.

Referring more particularly to the drawing, 10 indicates a container having a reticulated cylindrical side wall 11, a closed reticulated end wall 12, and a hinged lid 13. The lid 13 is disposed upon the opened end of the container opposite to the closed end 12. The cylindrical wall structure is formed with longitudinally extending wire strands 14, and circumferentially extending strands 15. These strands are welded together or soldered, as desired, and form a rigid cylindrical wall structure. Adjacent to the closed end of the container certain of the circumferentially extending strands are bowed outwardly as indicated at 16 in Fig. 4 to form receiving means for prongs 17 of a handle fork. The handle as indicated at 18 is preferably made of wire and has a grip portion 19 at its outer end. It will be seen that the container may be completely removed from the fork of the handle so that the device may be very compactly arranged when packed with camping outfits and the like. It may be desirable to place a pair of supporting legs 20 on the shank of the handle, these legs being formed with eyes 21 so that the supports may be forced in the ground or sand to hold the structure over a fire and to permit it to be readily rotated. The open end of the container 10 as previously explained is closed by a lid 13. This lid may be formed of reticulated material or may be of sheet metal stamping. In any event it is preferable that the lid be made with ears 22 which embrace the end element 23 of the container. On diametrically opposite sides of the lid from the ears 22 is a tang 24 which extends at right angles to the face of the lid and may frictionally engage the end element 23 to hold the lid closed. By reference to Fig. 4 of the drawing it will be seen that the diameter of the container 10 is substantially greater than the diameter of the article being cooked, such for example as the wiener indicated at 25. This arrangement insures that when the container and its handle 18 are rotated on their common longitudinal axis the container will produce rotation of the article being cooked so that it will not stick to the wires forming the walls of the container, and so that it will be subjected uniformly to the heat.

In operation of the present invention the container 10 is formed as here shown, after which the fork prongs 17 of the handle 18 may be positioned within the loops 16 along opposite side walls of the container so that these loops will hold the prongs in assembled relation therewith and provide a rigid structure. The container may then be disposed vertically, after which the lid 13 is opened and an article to be cooked is placed within the container. As shown in the drawing this article is a wiener which extends longitudinally within the container. When placed therein the lid 13 may be closed and the container 10 may thereafter be supported in a substantially horizontal position over a flame.

Figure 4:
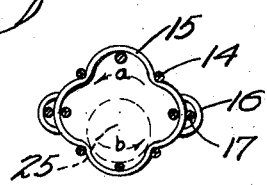
Fig. 4 is a view in transverse section as seen on the line 4—4 of Fig. 1, showing the construction of the reticulated container, the manner in which a handle is attached thereto, and the position of a wiener therein.

It will be assumed that the container 10 as shown in Fig. 4 rotates in the direction of the arrow $a$ as manipulated by the handle 18. The wiener will rotate in the direction of the arrow $b$, as it rests upon the lower surface of the container. Due to this arrangement it will be seen that the article being cooked will be continuously rotated or be turned over from time to time as would be the case if a fish was placed within the container for cooking. After the article of food has been cooked the lid 13 may be very easily swung to an open position so that the article may be readily dropped from the container. When it is desired to discontinue use of the container the fork may be withdrawn from the loops 16 and the container structure packed away in a small space for further use.

It will thus be seen that the structure here disclosed is simple in construction, may be very ruggedly made, and when used insures that articles of food may be quickly, thoroughly, and uniformly cooked. Attention is also directed to the fact that when wieners are cooked in a structure of this sort there is no tendency to burst the skin of the wiener, thus insuring that all of the flavor and juices will remain in the wiener as it is broiled or roasted.

While we have shown the preferred form of our invention, as now known to us, it will be understood that various changes might be made in the combination, construction, and arrangement of parts, by those skilled in the art, without departing from the spirit of the invention as claimed.

Having thus described our invention, what we claim and desire to secure by Letters Patent is:

1. A roasting device comprising a receptacle formed of a plurality of circumferentially extending and longitudinally extending strands of wire connected together in spaced relation, a handle member associated with said receptacle and having a pair of prongs formed on one end thereof, certain of said strands being outwardly bowed so as to frictionally engage said prongs for securing said handle in position on said receptacle, and a closure secured to the outer end of said receptacle.

2. A roasting device formed of a series of circumferentially and longitudinally extending elements connected together in spaced relation so as to provide a receptacle having a closed inner end and an open outer end, a handle associated with said receptacle and provided with a pair of prongs at its inner end, there being loops formed on the opposite sides of said receptacle adapted to receive said prongs for frictionally securing said handle to said receptacle, and a closure for closing the open end of said receptacle.

3. A roasting device formed of a series of circumferentially extending wire elements and a series of longitudinally extending wire elements, said wire elements being connected together in spaced relation so as to provide a receptacle having a closed inner end and an open outer end, a handle associated with said receptacle and being provided with a shank which terminates at one end with a pair of prongs, said receptacle being provided adjacent its closed end with a pair of loops adapted to receive said prongs for detachably holding said handle in position on said receptacle, a closure for closing the open end of said receptacle, and supporting members carried by the shank of said handle for rotatably supporting said receptacle in a roasting position.

4. A roasting device formed of a series of circumferentially and longitudinally extending wire elements connected together in spaced relation so as to provide a receptacle having a closed inner end and an open outer end, a handle associated with said receptacle and being provided at one end with a pair of prongs, a pair of loops formed on the opposite sides of said receptacle adjacent the closed end thereof and adapted to receive said prongs for detachably securing said handle in position on said receptacle, and supporting members associated with said handle and having bearing portions for rotatably supporting said receptacle in a roasting position.

HARRY WESTBERG.
RICHARD F. OLSON.